(12) United States Patent
Takahashi et al.

(10) Patent No.: US 7,677,202 B2
(45) Date of Patent: Mar. 16, 2010

(54) PET CLEANING APPARATUS

(75) Inventors: Tsunejiro Takahashi, Tokyo (JP);
Toshitaka Okumura, Yokohama (JP);
Koichi Kubo, Tokyo (JP)

(73) Assignee: Shoei Butsuryu Co., Ltd. (JP)

( * ) Notice: Subject to any disclaimer, the term of this patent is extended or adjusted under 35 U.S.C. 154(b) by 548 days.

(21) Appl. No.: 11/226,652

(22) Filed: Sep. 14, 2005

(65) Prior Publication Data

US 2007/0056525 A1 Mar. 15, 2007

(51) Int. Cl.
*A01K 13/00* (2006.01)
(52) U.S. Cl. ...................... 119/665; 119/673
(58) Field of Classification Search ............... 119/650, 119/651, 665, 673, 674, 675, 676, 677, 678; 239/310, 311, 337
See application file for complete search history.

(56) References Cited

U.S. PATENT DOCUMENTS 4,291,646 A * 9/1981 Leonaggeo, Jr. ............ 119/702
4,927,568 A * 5/1990 Campau ..................... 261/36.1
2003/0024485 A1* 2/2003 Freidell ....................... 119/665
2005/0150467 A1* 7/2005 Segura Jobal ............... 119/668

FOREIGN PATENT DOCUMENTS

| JP | 02-249432 | | 10/1990 |
| JP | 06046717 | * | 2/1994 |
| JP | 11-187782 | | 7/1999 |
| JP | 2003-265938 | | 9/2003 |
| JP | 2005-143358 | | 6/2005 |

* cited by examiner

*Primary Examiner*—T. Nguyen
(74) *Attorney, Agent, or Firm*—Kilpatrick Stockton LLP

(57) ABSTRACT

A pet cleaning apparatus comprises a cleaning tub, a saturated solution generator and an air-bubble generating nozzle. The saturated solution generator is connected to the cleaning tub and configured to generate a saturated solution by saturating a pressurized fluid with air. The air-bubble generating nozzle is connected to the cleaning tub and the saturated solution generator and configured to generate a fine air-bubble in the saturated solution.

4 Claims, 3 Drawing Sheets

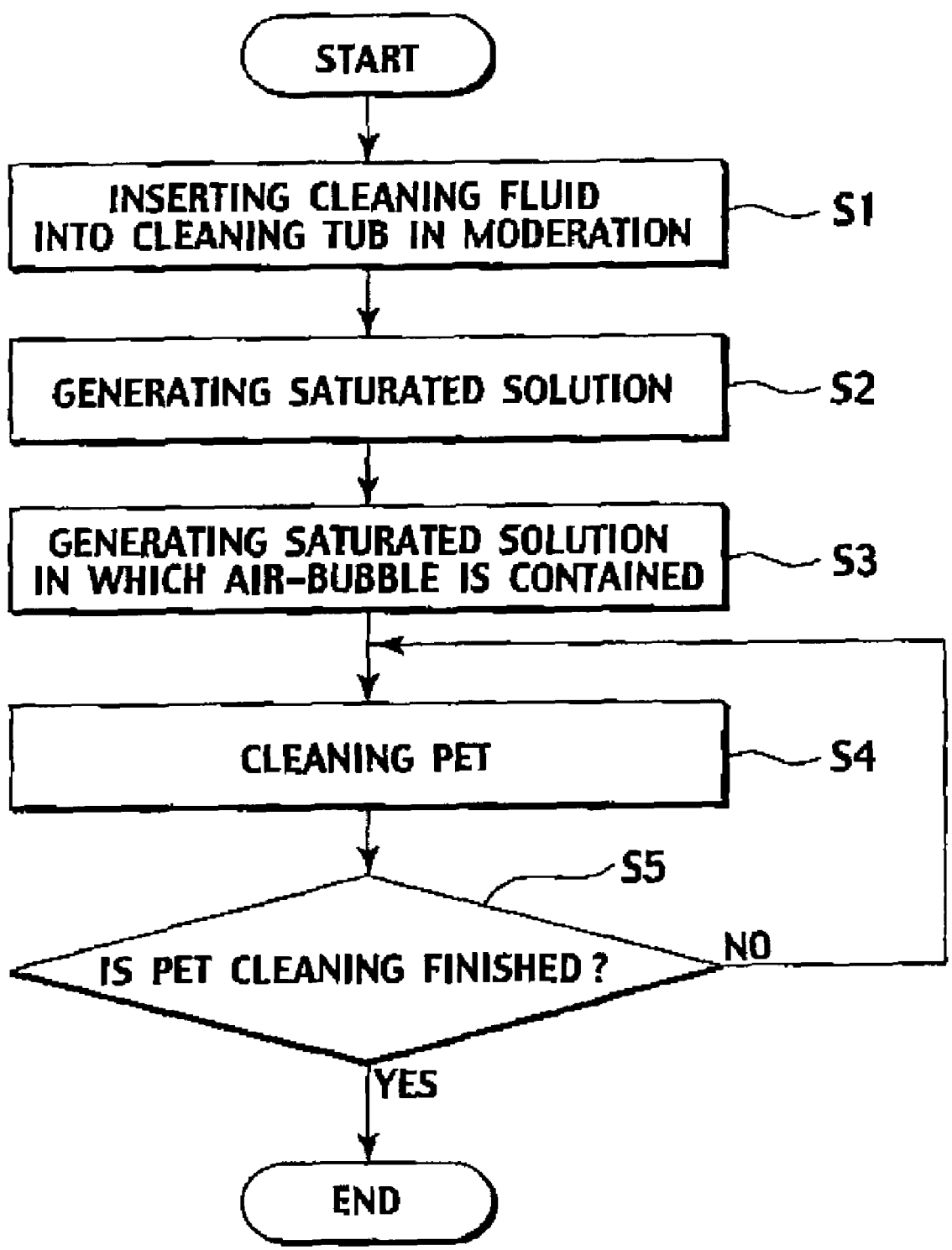

PET CLEANING APPARATUS

BACKGROUND OF THE INVENTION

1. Field of the Invention

The present invention relates to a pet cleaning method and a pet cleaning apparatus for cleaning skin and hair of a pet such as a dog or a cat.

2. Description of the Related Art

It is conventionally requested to keep clean hair of a pet such as a dog or a cat, in order to keep the pet in a room and to get rid of a flea and a mite from the pet hair such that the pet is prevented from having skin disease.

A conventional pet cleaning method and pet cleaning apparatus are disclosed in Japanese Unexamined Patent Publications No.H11-187782 and No.H11-206259. The conventional pet cleaning method is a method for spraying a cleaning fluid from a shower and then sousing the cleaning fluid over the pet. If necessary, a cleaning agent such as a soup is contained in the cleaning fluid.

The pet hair has the property of preventing water from penetrating into pet skin to avoid the loss of body heat. Therefore, it is difficult to fully clean the pet skin by only using the method for sousing the cleaning fluid over the pet. Also, when the pet has skin disease, the cleaning fluid including the cleaning agent cannot be used.

SUMMARY OF THE INVENTION

An object of the present invention is to provide a pet cleaning method and a pet cleaning apparatus which are capable of cleaning pet hair and pet skin automatically.

In order to achieve the above object, the present invention provides a pet cleaning method comprising steps of: generating a saturated solution in which a fine air-bubble is contained; feeding the saturated solution into a cleaning tub in which a pet is put; and cleaning pet hair and pet skin by floating the pet hair by using the air-bubble.

According to the present invention, when pet hair is floated by a rising fine air-bubble, pet skin is exposed to be cleaned by a part of the rising air-bubble. Further, the pet hair and the pet skin are cleaned by ultrasonic vibrations generated by a burst of the air-bubble. Therefore, the pet hair and the pet skin can be automatically cleaned without damaging the pet skin by a cleaning fluid in which a cleaning agent is contained.

In order to achieve the above object, the present invention provides a pet cleaning apparatus comprising: a cleaning tub; a saturated solution generator connected to the cleaning tub and configured to generate a saturated solution by saturating a pressurized fluid with air; and an air-bubble generating nozzle connected to the cleaning tub and the saturated solution generator and configured to generate a fine air-bubble in the saturated solution.

According to the present invention, when pet hair is floated by a rising fine air-bubble, pet skin is exposed to be cleaned by a part of the rising air-bubble. Further, the pet hair and the pet skin are cleaned by ultrasonic vibrations generated by a burst of the air-bubble. Therefore, the pet hair and the pet skin can be automatically cleaned without damaging the pet skin by a cleaning fluid in which a cleaning agent is contained.

BRIEF DESCRIPTION OF THE DRAWINGS

FIG. 3 is a flowchart of a pet cleaning method according to the embodiment of the present invention.

DESCRIPTION OF THE PREFERRED EMBODIMENT

In reference with FIGS. 1 to 3, an embodiment of the present invention will be described.

Figure 1:
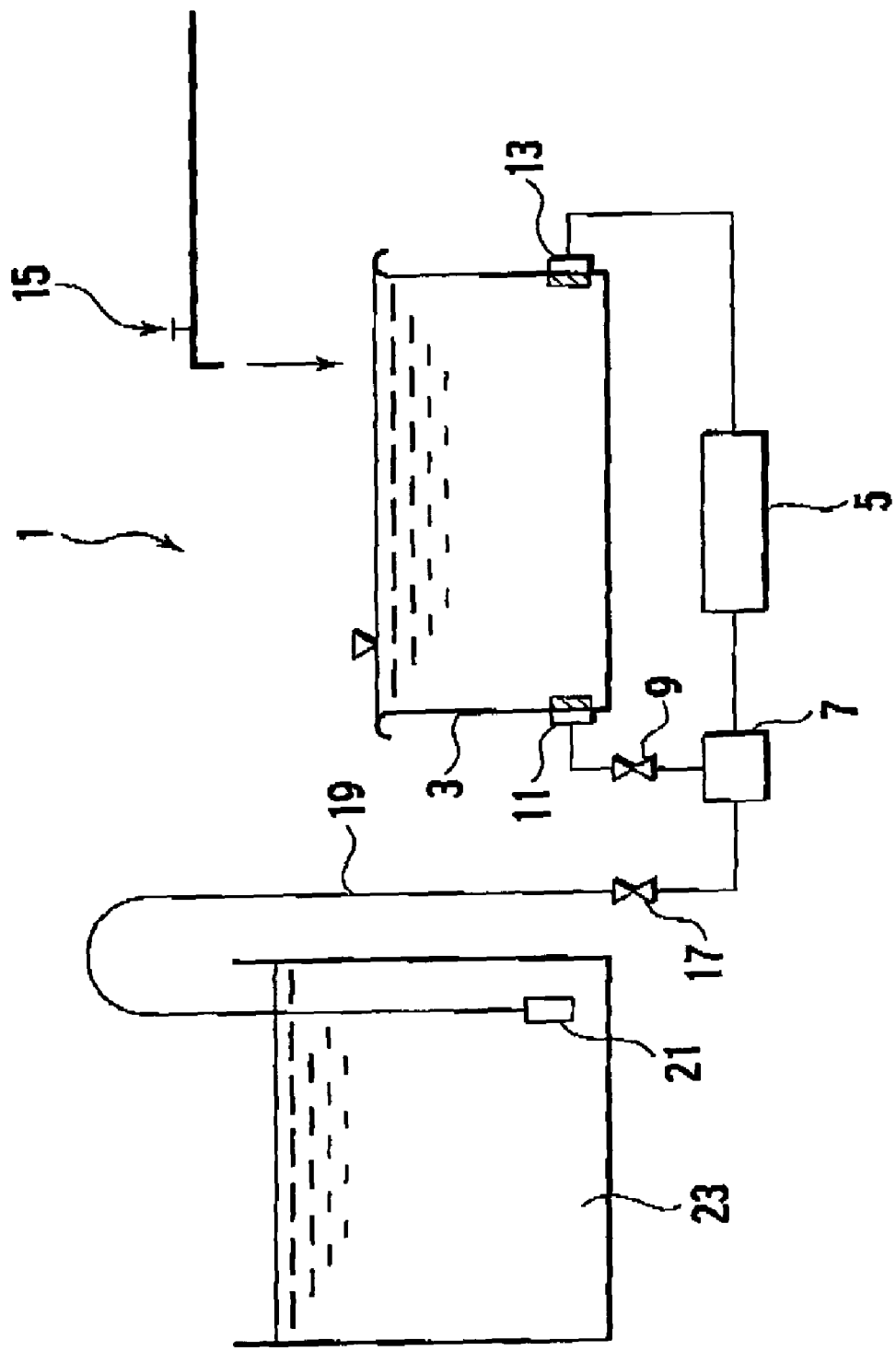
FIG. 1 is a schematic cross-sectional view of a pet cleaning apparatus according to an embodiment of the present invention.

As shown in FIG. 1, a pet cleaning apparatus 1 comprises a cleaning tub 3, a saturated solution generator 5, a filter 7, an opening-closing valve 9, a suction nozzle 11, an air-bubble generating nozzle 13, a water-feed portion 15, an opening-closing valve 17, a hose 19, a suction nozzle 21 and a tank 23.

A pet is put in the cleaning tub 3 when cleaning the pet. The saturated solution generator 5 is connected to the cleaning tub 3. The saturated solution generator 5 generates a saturated solution by saturating a pressurized fluid with air which is suctioned by a pump. The filter 7 is arranged on a suction side of the saturated solution generator 5 and connected to the saturated solution generator 5. The suction nozzle 11 is connected to the filter 7 via the opening-closing valve 9 and is attached on a bottom portion of the cleaning tub 3. The suction nozzle 11 suctions a cleaning fluid (hot water or room temperature water) in the cleaning tub 3. It is noted that the suction nozzle 11 may be attached on a tip portion of a horse and suspended from an upper portion of the cleaning tub 3 into the cleaning tub 3.

The air-bubble generating nozzle 13 is arranged on a discharge side of the saturated solution generator 5 and connected to the saturated solution generator 5. The air-bubble generating nozzle 13 is attached on the bottom portion of the cleaning tub 3. The air-bubble generating nozzle 13 generates a fine air-bubble having about 2-20 μm in particle diameter when discharging in the cleaning tub 3 the saturated solution generated by the saturated solution generator 5. It is noted that the air-bubble generating nozzle 13 may be attached on a tip portion of a hose and suspended from the upper portion of the cleaning tub 3 into the cleaning tub 3.

The water-feed portion 15 feeds hot water or room temperature water into the cleaning tub 3. The hose 19 is connected to the filter 7 via the opening-closing valve 17. The suction nozzle 21 is attached on a tip portion of the hose 19 and suspended into the tank 23.

As a method of discharging dirt which appears in a pet cleaning to outside the cleaning tube 3, the following two methods are cited: (1) the dirt contained in the cleaning fluid is compelled to spill over the cleaning tub 3 by feeding hot water or room temperature water into the cleaning tub 3 by means of the water-feed portion 15; and (2) the dirt contained in the cleaning fluid is compelled to be discharged into the tank 23 by suctioning the cleaning fluid from the air-bubble generating nozzle 13 by means of the saturated solution generator 5 under the condition of closing the opening-closing valve 9 and opening the opening-closing valve 17.

Next, structure of the air-bubble generating nozzle 13 will be described in detail.

Figure 2:
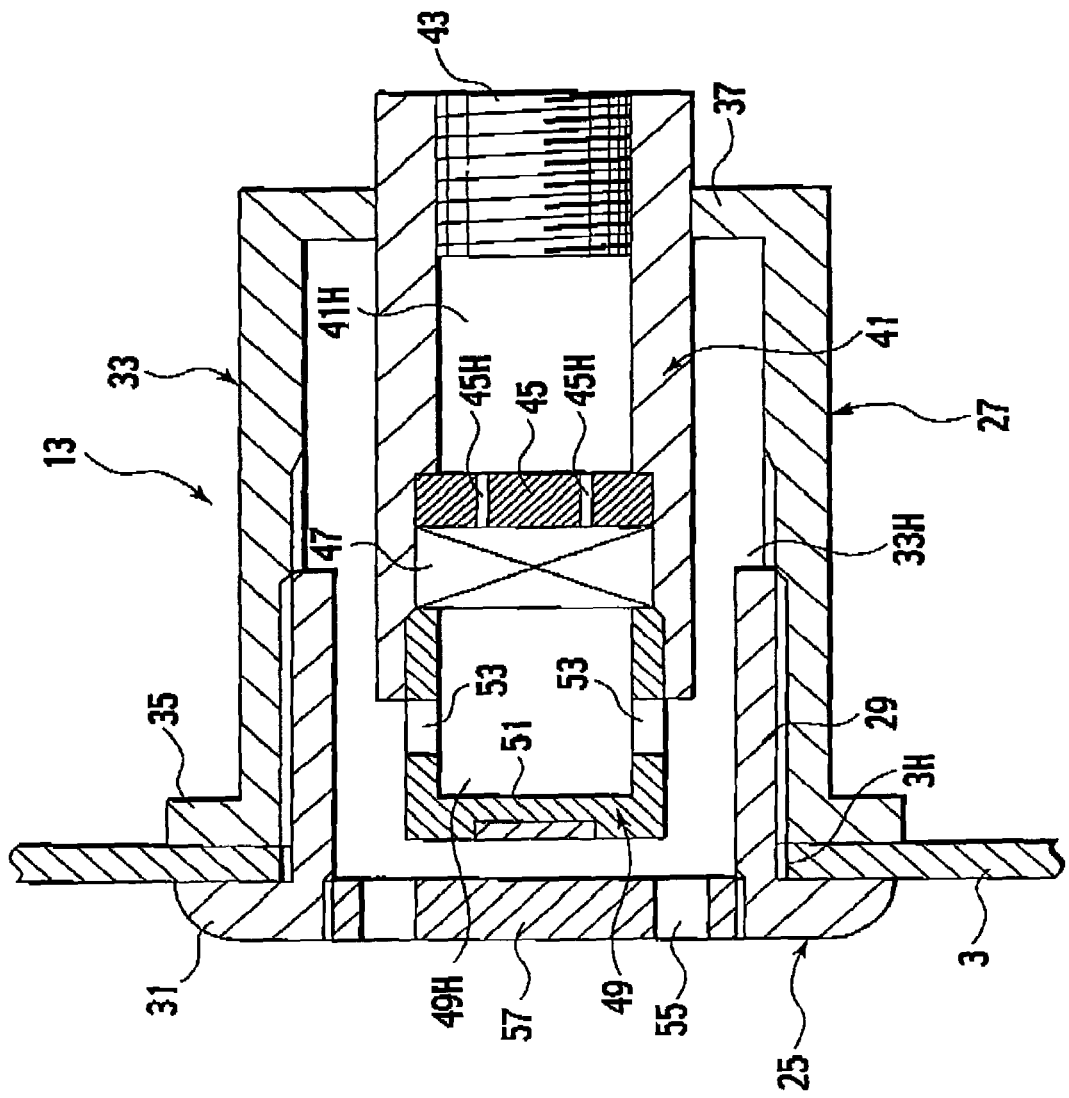
FIG. 2 is a cross-sectional view of an air-bubble generating nozzle according to the embodiment of the present invention.

As shown in FIG. 2, the air-bubble generating nozzle 13 comprises a fixed body 25 and a nozzle main body 27. The fixed body 25 is attached to an inner side of the cleaning tub 3 so as to penetrate through the cleaning tub 3. The nozzle main body 27 is attached to the fixed body 25 protruding outside the cleaning tub 3.

The fixed body 25 comprises an inner main body 29 and a flange portion 31. The inner main body 29 has a substantial cylindrical-shape and an outer circumference surface on which a female thread portion is formed. The flange portion 31 has an annular shape and is integrally mounted to the inner main body 29 so as to extend outward from one end of the inner main body 29.

The nozzle main body 27 comprises an outer main body 33, a flange portion 35, a lid portion 37 and a pipe 41. The outer main body 33 has a substantial cylindrical-shape and an inner circumference surface on which a male thread portion is formed. The flange portion 35 has an annular shape and is integrally mounted to the outer main body 33 so as to extend outward from one end of the outer main body 33. The lid portion 37 has an introduction hole at a center potion thereof and is integrally mounted to the outer main body 33 so as to extend inward from the other end of the outer main body 33.

The pipe 41 is introduced into an inner hole 33H of the outer main body 33 through the introduction hole of the lid portion 37. The pipe 41 has an opening (inlet) 43 at one end thereof extending from the outer main body 33. The saturated solution fed from the saturated solution generator 5 flows in an inner hole 41H of the pipe 41 through the inlet 43.

An orifice 45, a mesh member 47 and an engaged pipe 49 are arranged in the inner hole 41H. The orifice 45 has a plurality of small holes 45H and is detachably inserted and attached in the pipe 41. The mesh member 47 is a member which is produced by overlapping a plurality of pieces (e.g. about 30-60 pieces) of fine mesh. The mesh member 47 is detachably arranged at a downstream side of the orifice 45 in a flow direction of the saturated solution so as to contact with the orifice 45. It is noted that the mesh member 47 may be arranged at the downstream side of the orifice 45 in the flow direction of the saturated solution so as to be located at a suitable distance away from the orifice 45.

The engaged pipe 49 is screwed into and engaged with the other end of the pipe 41 in order to fix the orifice 45 and the mesh member 47 in the pipe 41. The engaged pipe 49 has an opening end contacting with the mesh member 47 and a closing end 51 closing an inner hole 49H. The engaged pipe 49 further has a plurality of opening portions 53 at a peripheral wall thereof. The opening portion 53 is a small hole having a few millimeters in diameter. It is noted that a mesh member having the same structure as the mesh member 47 may be arranged in the opening portion 53.

The inner hole 49H is communicated with the inner hole 33H of the outer main body 33 via the opening portion 53. In the engaged pipe 49, a flow path is rapidly changed by the closing end 51 and the opening portion 53. When the saturated solution flows from the inner hole 49H into the inner hole 33H, the saturated solution causes convection in the inner hole 33H to be agitated.

In a state of attaching the fixed body 25 and the nozzle main body 27 to the cleaning tub 3, a gap 57 is detachably screwed into and attached to the one end of the inner main body 29. The gap 57 has a disk-shape and a diameter which is substantially equal to an inner diameter of the inner main body 29. The gap 57 further has a plurality of small holes (outlets) 55. The outlet 55 is a small hole having a few millimeters in diameter. It is noted that a mesh member having the same structure as the mesh member 47 may be arranged in the outlet 55.

Next, a method of attaching the fixed body 25 and the nozzle main body 27 to the cleaning tub 3 will be described. Firstly, after the orifice 45 and the mesh member 47 are inserted into the inner hole 41H of the pipe 41, the engaged pipe 49 is screwed into the other and of the pipe 41 to fix the orifice 45 and the mesh member 47. Secondly, the inner main body 29 penetrates through a hole portion 3H which is formed on the cleaning tub 3 to protrude outside the cleaning tub 3. At this time, the flange portion 31 abuts on an inner surface of the cleaning tub 3. Finally, the outer main body 33 is attached to the inner main body 29 by screwing the male thread portion of the outer main body 33 into the female thread portion of the inner main body 29. At this time, the flange portion 35 abuts on an outer surface of the cleaning tub 3. The cleaning tub 3 is sandwiched between the flange portions 31, 35, in a state of attaching the fixed body 25 and the nozzle main body 27 to the cleaning tub 3.

Next, a method of cleaning a pet by using the pet cleaning apparatus 1 will be described.

Firstly, in a state of closing the opening-closing valves 9, 17, hot water or room temperature water (cleaning fluid) is inserted into the cleaning tub 3 in moderation so as to reach above the suction nozzle (step S1). Next, in a state of opening the opening-closing valve 9, the saturated solution generator 5 is driven. The cleaning fluid is suctioned by the saturated solution generator 5 via the suction nozzle 11, the opening-closing valve 9 and filter 7 and becomes to be a saturated solution generated by saturating a pressurized cleaning fluid with air (step S2). The saturated solution becomes to be a saturated solution in which a fine air-bubble is contained, in the air-bubble generating nozzle 13 (step S3).

Here, in the air-bubble generating nozzle 13, a mechanism of generating the saturated solution in which a fine air-bubble is contained will be described in detail. The saturated solution generated by the saturated solution generator 5 flows from the inlet 43 of the pipe 41 into the inner hole 41H of the pipe 41 and then is sprayed toward the mesh member 47 via the small holes 45H of the orifice 45. Since the saturated solution is rapidly depressurized after passing through the small holes 45H, a part of the air dissolved in the saturated solution appears in the saturated solution as an air-bubble. Then, after the air-bubble contained in the saturated solution is atomized with the mesh member 47, the air-bubble is further atomized by clashing with the closing end 51.

The saturated solution in which the atomized air-bubble is contained flows in the inner hole (convection chamber) 33H of the outer main body 33 which has volume larger than that of the inner hole 49H of the engaged pipe 49, via the opening portions 53. Since the saturated solution is rapidly depressurized again after passing through the opening portions 53, a part of the air dissolved in the saturated solution appears in the saturated solution as an air-bubble. Then the air-bubble contained in the saturated solution furthermore atomized by clashing with an inner surface of the inner main body 25 and agitation effect in the convection chamber.

By the above-described mechanism, when the saturated solution is discharged from the air-bubble generating nozzle 13 into the cleaning tub 3, the saturate solution includes a lot of the air-bubbles each which has about 1-20 μm in particle diameter. Here, the amount of the saturated solution to be discharged into the cleaning tub 3 is about 8 liters/min. A density of the air-bubble contained in the saturated solution is 10000-15000 bubbles/cm3. When the saturated solution is discharged into the cleaning tub 3, the cleaning fluid becomes to be clouded by the air-bubbles.

When the fine air-bubble rises in the cleaning tub 3, the pet skin is cleaned (step S4). More specifically, the pet skin is exposed by floating the pet hair by the rising air-bubble and is cleaned by a part of the rising air-bubble. Here, ultrasonic vibrations generated by a burst of the rising air-bubble directly stimulate the pet skin and pet joints to stimulate circulation of pet blood, which increases body heat of the pet. Further, minus-irons having a density of 50000-140000 irons/cm3 are generated by the burst of the rising air-bubble. Finally, it is determined whether or not cleaning the pet hair and the pet skin is ended (step S5). If not cleaned, it returns to the step S4. If cleaned, cleaning the pet hair and the pet skin are ended.

The pet cleaning method in which the pet cleaning apparatus 1 is employed has the following advantageous features.

When pet hair is floated by a rising fine air-bubble, pet skin is exposed to be cleaned by a part of the rising air-bubble. Further, the pet hair and the pet skin are cleaned by ultrasonic vibrations generated by a burst of the air-bubble. Therefore, the pet hair and the pet skin can be automatically cleaned without damaging the pet skin by a cleaning fluid in which a cleaning agent is contained.

Since the ultrasonic vibration generated by the burst of the air-bubble directly stimulates the pet skin and pet joints, cure effect for pet skin disease etc. is expected.

Since a lot of minus-irons are generated, minus-iron effect is expected.

What is claimed is:

1. A pet cleaning apparatus comprising:
    a cleaning tub;
    a saturated solution generator connected to the cleaning tub and configured to generate a saturated solution by saturating a pressurized fluid with air; and
    an air-bubble generating nozzle connected to the cleaning tub and the saturated solution generator and configured to generate a fine air-bubble in the saturated solution,
    wherein the air-bubble generating nozzle comprises:
    a nozzle main body attached to an outer side of the cleaning tub and configured to generate the fine air-bubble in the saturated solution; and
    a fixed body attached to an inner side of the cleaning tub and the nozzle main body and configured to discharge into the cleaning tub the saturated solution in which the fine air-bubble is contained,
    wherein the nozzle main body comprises:
    a pipe configured to generate the fine air-bubble in the saturated solution; and
    a cylindrical portion attached to the fixed body and having a convection chamber which opens to the pipe and is configured to further generate a fine air-bubble in the saturated solution, and
    wherein the pipe includes a mesh member and an orifice member, which is independent of the mesh member and has a plurality of small holes, in a flow channel thereof through which the saturated solution passes, and
    the saturated solution is rapidly depressurized to generate the fine air-bubble therein after having passed through the small holes, and the generated fine air-bubble is atomized with the mesh member.

2. The pet cleaning apparatus according to claim 1, wherein the pipe opens to the convection chamber of the cylindrical portion via a sub-pipe.

3. The pet cleaning apparatus according to claim 2, wherein the sub-pipe comprises:
    a first end portion opening to the pipe;
    a closed second end portion; and
    a peripheral wall on which a plurality of small holes opening to the convection chamber is formed.

4. The pet cleaning apparatus according to claim 1, wherein the saturated solution generator is configured to suction a fluid located in the cleaning tub or another tank.

* * * * *